United States Patent
Mukherjee et al.

(10) Patent No.: US 12,493,822 B2
(45) Date of Patent: Dec. 9, 2025

(54) REDUCING COMPUTATIONAL BURDEN ON MACHINE LEARNING PROCESSES BY DETECTING NON-LINEAR RELATIONSHIPS

(71) Applicant: Bank of America Corporation, Charlotte, NC (US)

(72) Inventors: Maharaj Mukherjee, Poughkeepsie, NY (US); Prashant Thakur, Gujarat (IN)

(73) Assignee: Bank of America Corporation, Charlotte, NC (US)

( * ) Notice: Subject to any disclaimer, the term of this patent is extended or adjusted under 35 U.S.C. 154(b) by 873 days.

(21) Appl. No.: 17/746,128

(22) Filed: May 17, 2022

(65) Prior Publication Data

US 2023/0409955 A1    Dec. 21, 2023

(51) Int. Cl.
*G06F 18/2115*    (2023.01)
*G06F 16/28*    (2019.01)
*G06N 20/00*    (2019.01)

(52) U.S. Cl.
CPC .......... *G06N 20/00* (2019.01); *G06F 16/285* (2019.01); *G06F 18/2115* (2023.01)

(58) Field of Classification Search
CPC .... G06N 20/00; G06F 16/285; G06F 18/2115
See application file for complete search history.

(56) References Cited

U.S. PATENT DOCUMENTS

| | | | |
|---|---|---|---|
| 9,189,752 B2 * | 11/2015 | Fischbacher | G16B 40/20 |
| 10,386,729 B2 * | 8/2019 | Lee | G03F 7/70616 |
| 10,842,440 B2 * | 11/2020 | Shusterman | A61B 5/7225 |
| 2022/0374765 A1 * | 11/2022 | Wu | G06F 16/24578 |
| 2023/0015302 A1 * | 1/2023 | Schütze | B01L 3/502753 |
| 2023/0049418 A1 * | 2/2023 | Saha | G06N 3/0464 |
| 2023/0353739 A1 * | 11/2023 | Ge | H04N 19/132 |

* cited by examiner

*Primary Examiner* — Beau D Spratt
(74) *Attorney, Agent, or Firm* — Weiss & Arons LLP (57) ABSTRACT

Apparatus and methods for detecting non-linear data dependencies in machine learning are provided. The methods may include receiving a data set comprising a plurality of data features, the data set for processing by a machine learning model operating on a machine learning system. The methods may also include plotting the data set in multi-dimensional space and linearizing the plotted, multi-dimensional space by feeding the plotted data to an algorithm programmed to execute the Delaunay triangulation method. The methods may further include receiving from the algorithm the data set linearized in a faceted space and detecting linear correlations in the linearized data set. The methods may additional include identifying a first data feature that has a correlation coefficient with a second data feature that is greater than an accuracy metric and removing the first data feature from the data set to create a reduced data set.

18 Claims, 5 Drawing Sheets

REDUCING COMPUTATIONAL BURDEN ON MACHINE LEARNING PROCESSES BY DETECTING NON-LINEAR RELATIONSHIPS

FIELD OF TECHNOLOGY

Aspects of the disclosure relate to machine learning. Specifically, aspects of the disclosure relate to optimizing the speed of machine learning processes.

BACKGROUND

Machine learning systems are computers that utilize mathematical models to learn from both inputted data and experience. Typically, this learning occurs without direct instruction. Machine learning systems may imitate the way humans learn from information as well as the way humans learn from personal experience.

Machine learning systems may use a machine learning model. The machine learning model may be specifically designed to perform a predetermined task.

Current trends have encouraged continuously increasing the amount of data inputted into developing machine learning models. Many speculate that the robustness of the machine learning model is directly dependent on the quantity of the data absorbed by the model. Additionally, many also believe that the robustness of a machine learning model depends on the amount of data input into the machine learning model.

However, it should be noted that the more data that is input into a model, the more resources and time the system will need in order to create, improve and enhance a machine learning model. It should be further noted that the more granularly the system reviews the inputted data, the more resources and time the system will need to create, improve and enhance the machine learning model. Therefore, to optimize a machine learning model and associated system, it would be desirable to ensure that the data inputted into the system is purely, or mostly, information that is advantageous to, and improves, the machine learning model and underlying system. Specifically, the size of a data set fed to a machine learning algorithm can significantly impact the time it takes the algorithm to process the data. Each additional column of data in a data set fed to a machine learning algorithm can require exponentially more processing time than a data set not having the extra data column.

It would therefore be desirable to identify duplicate data in a data set and highly correlated data in a data set. Duplicate data may be understood to mean two data element sets that include the same, or very similar, information. Highly correlated data may be understood to mean two data element sets that are closely related or two data element sets that are substantially, or completely, dependent on one another. An example of highly correlated data may include a first set of data elements that corresponds to a height and a width of a predefined item, and a second set of data elements that corresponds to a weight of the predefined item. The height and the width of the predefined item when compared to the weight of the predefined item may be considered highly correlated.

When duplicate data or highly correlated data is received at a machine learning system, the associated model may not learn, or may not learn significantly, from the inputted duplicate or highly correlated data. Therefore, both resources and time may be wasted on duplicate and highly correlated data inputted into, and processed at, a machine learning model.

As such, it would be desirable for systems and methods that reduce the quantity of data inputted into a machine learning model and associated system by removing both the duplicate data and the highly correlated data. The reduction of the inputted data may retain the accuracy of the machine learning system as well as reduce wasted resources and time.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus and methods for reducing a computational load on a machine learning algorithm is provided. The apparatus and methods may include identifying relationships between a data set being fed to the machine learning algorithm using a plurality of manipulations. The relationships may be identified based on an accuracy level. The accuracy level may be an accuracy metric selected by a user and/or may be problem dependent. As such, the accuracy level may be set based on the identified possibility of a false positive output vis-à-vis the identified possibility of a false negative output.

The data set may be a table or a data object. The data set may be an Excel™ spreadsheet. The data set may include data features. Exemplary data features may include columns, or cells, in a table or data object. Once the data features have been reduced, the data set including the remaining data features may be input into an AI/ML model/engine. The AI/ML model/engine may process the data features to produce an output. The output of the AI/ML model/engine may be presented to the user.

The methods may include methods for detecting non-linear data dependencies in machine learning. The methods may include receiving a user selection of an accuracy metric. Exemplary accuracy metrics include a correlation coefficient greater than 0.7, a correlation coefficient greater than 0.5, or any other suitable correlation coefficient.

The methods may include receiving a data set. The data set may include features described above. The data set may include a plurality of data features. Each data feature may include a plurality of data elements. The data set may be used by the systems and methods for being processing by a machine learning model operating on a machine learning system.

In exemplary embodiments, the data set may be a table of data. The data features may be columns of data in the table. The data elements may be data listed in a column.

The methods may include normalizing the data elements within each data feature such that the data elements included within each data feature, after the normalization, range between a minimum value and a maximum value. Exemplary normalization ranges include a minimum value of 0 and a maximum value is 1, a minimum value of 0 and a maximum value of 100, or any other suitable ranges. The minimum value and the maximum value may be applied to all of the data features in the data set.

The methods may include plotting the data set in multi-dimensional space. Each data feature may represent an axis in the multi-dimensional space. In some embodiments, each point in the multi-dimensional space may represent a row of data included in the data set.

For example, in exemplary embodiments, when the data set includes a plurality of columns, the plotting of the data set in multi-dimensional space may be performed such that each column represents an axis in the multi-dimensional space and each row represents a point in the multi-dimensional space.

The methods may further include linearizing the plotted, multi-dimensional space. The linearization may be executed so that the data, once linearized, can be manipulated using Singular Value Decomposition (SVD) and/or Pearson's co-variance (PCV) to identify relationships between data features. Because each of SVD and PCV are only able to identify linear relationships, the linearization of the data set allows SVD and/or PCV to be applied and to therefore identify relationships between data features that would otherwise not be identified by SVD and/or PCV.

The linearization may be executed by feeding the data points of the plotted, multi-dimensional space to an algorithm programmed to execute the Delaunay triangulation method. The Delaunay triangulation method may be executed by a classical optimizer operating on a classical hardware processor operating with a hardware memory. The Delaunay Triangulation may comprise executing the triangulation methods described in the publication The Delaunay Triangulation for Multidimensional Surfaces and its Approximative Properties, by V. A. Klyachin and A. A. Shirokii, *Volgograd State University, Universitetskii pr.* 100, *Volgograd, 400062 Russia*, Dec. 23, 2021, which is hereby incorporated by reference herein in its entirety.

The methods may include receiving from the algorithm the multi-dimensional space linearized. The methods may additionally include detecting linear correlations in the linearized multi-dimensional space using one or both of SVD and PCV. When a linear correlation is detected, a correlation coefficient may also be output by the identifying algorithm (SVD or PCV). The methods may include identifying a first data feature that has a correlation coefficient with a second data feature that is greater than the accuracy metric. When the correlation coefficient is greater than the accuracy metric, the methods may include removing the first data feature from the data set to create a reduced data set. When the correlation coefficient is less than the accuracy metric, no action may be taken.

In some embodiments, the methods may include iteratively re-running the SVD and/or the PCV until no more correlation coefficients greater than the accuracy metric are identified. The re-running may include, in some embodiments, re-plotting the reduced data set in the multi-dimensional space and then re-running the SVD and/or the PCV to identify an additional relationship. This may be iteratively performed until no additional relationships are identified.

After the data set has been reduced, the methods may include inputting the reduced data set into the machine learning model. When the methods include iteratively re-running the SVD and/or the PCV, the final reduced data set may be fed to the machine learning model. The methods may include running the machine learning model. The methods may further include outputting a result from the machine learning model.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

Figure 1:
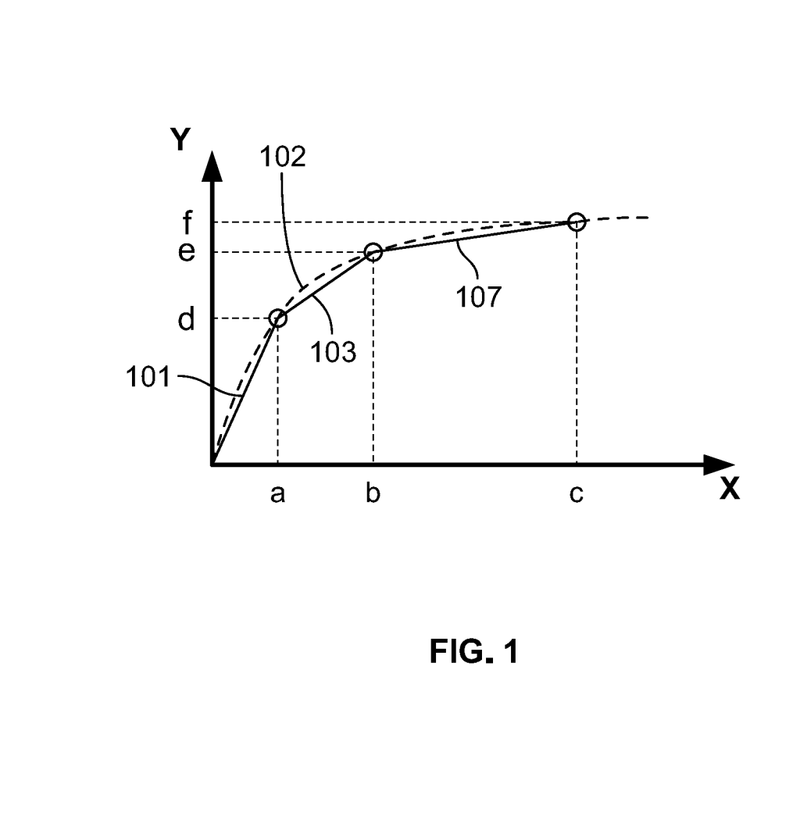
FIG. 1 shows illustrative data reduction methods.

FIG. 1 shows an exemplary method for reducing data complexity. In FIG. 1, curve 102 is illustrated on a two-dimensional X,Y coordinate system. In FIG. 1, curve 102 has been approximated by straight lights 101, 103 and 107. Approximating curve 101 using straight lines instead of a continually varying equation is an exemplary method for reducing data complexity in two dimensions.

Figure 2:
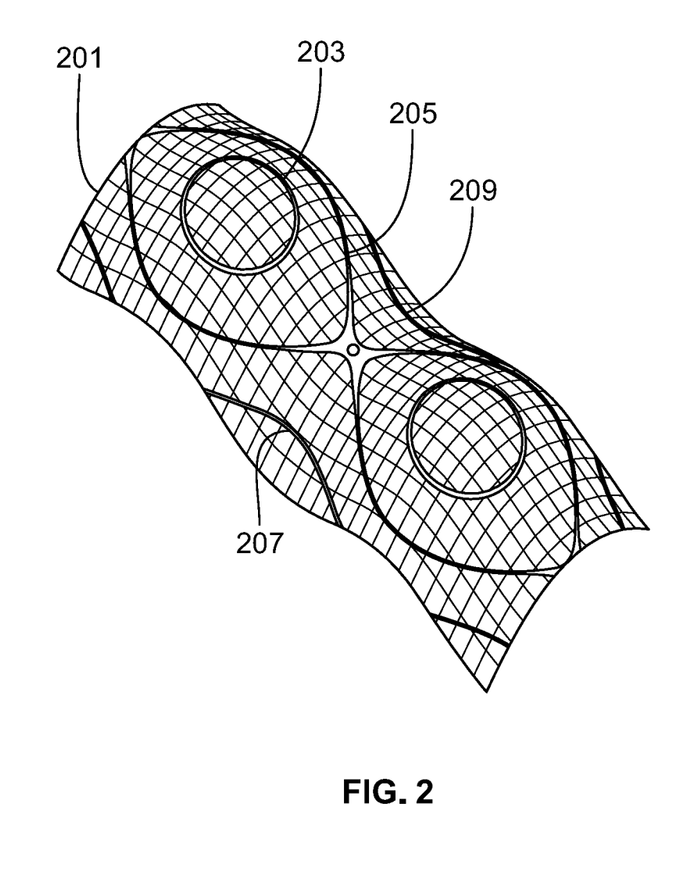
FIG. 2 shows illustrative data reduction methods.

FIG. 2 shows another exemplary method for recuing data complexity. In FIG. 2, three-dimensional surface 201 is illustrated. In FIG. 2, three-dimensional surface 201 has been approximated by curves 203, 205, 207 and 209. Approximating three-dimensional surface 201 using curves 203, 205, 207 and 209 instead a continuous three-dimensional surface is an exemplary method of reducing data complexity in three dimensions.

Figure 3:
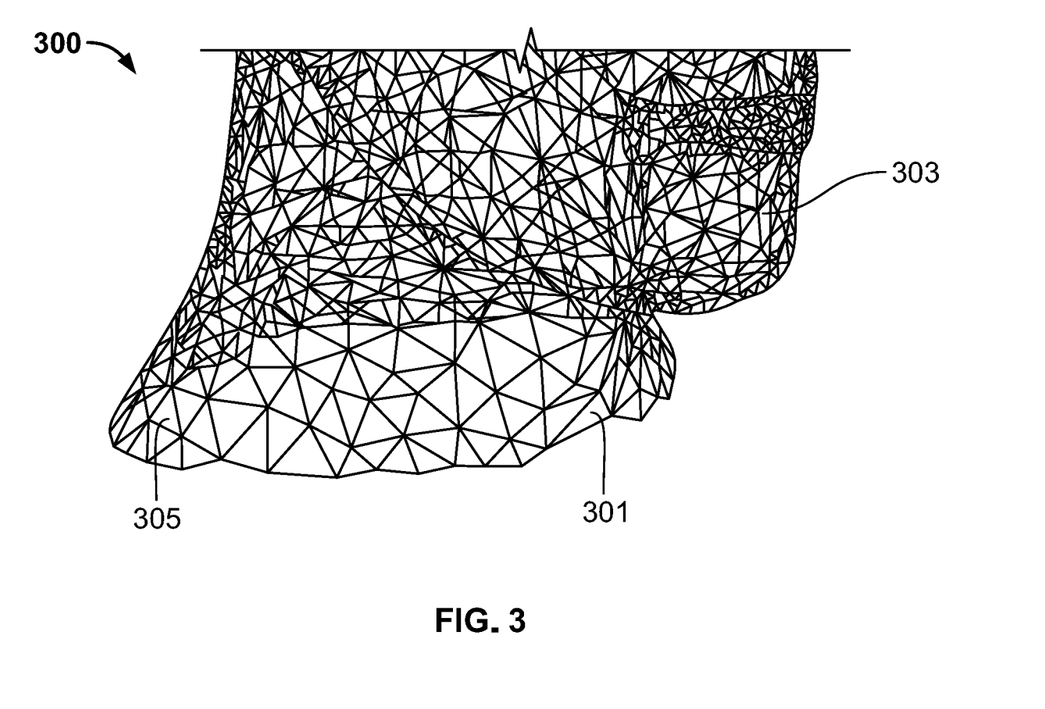
FIG. 3 shows illustrative data reduction methods.

FIG. 3 shows another exemplary method for reducing data complexity. In FIG. 3, a three-dimensional surface 300 representing a bottom portion of a human face is shown as being illustrated using a plurality of triangles, such as triangles 301, 303 and 305. Triangulation methods such as those described herein may be used to convert a smooth three-dimensional contour of a human face into a group of triangles. It should be noted that areas on the face that have greater complexity due to changes in curvature, extra features, etc., such as the mouth and the curving of the chin, may require more triangles per unit surface area than a different area on the face that has less complexity, such as the cheek or the neck.

Figure 4:
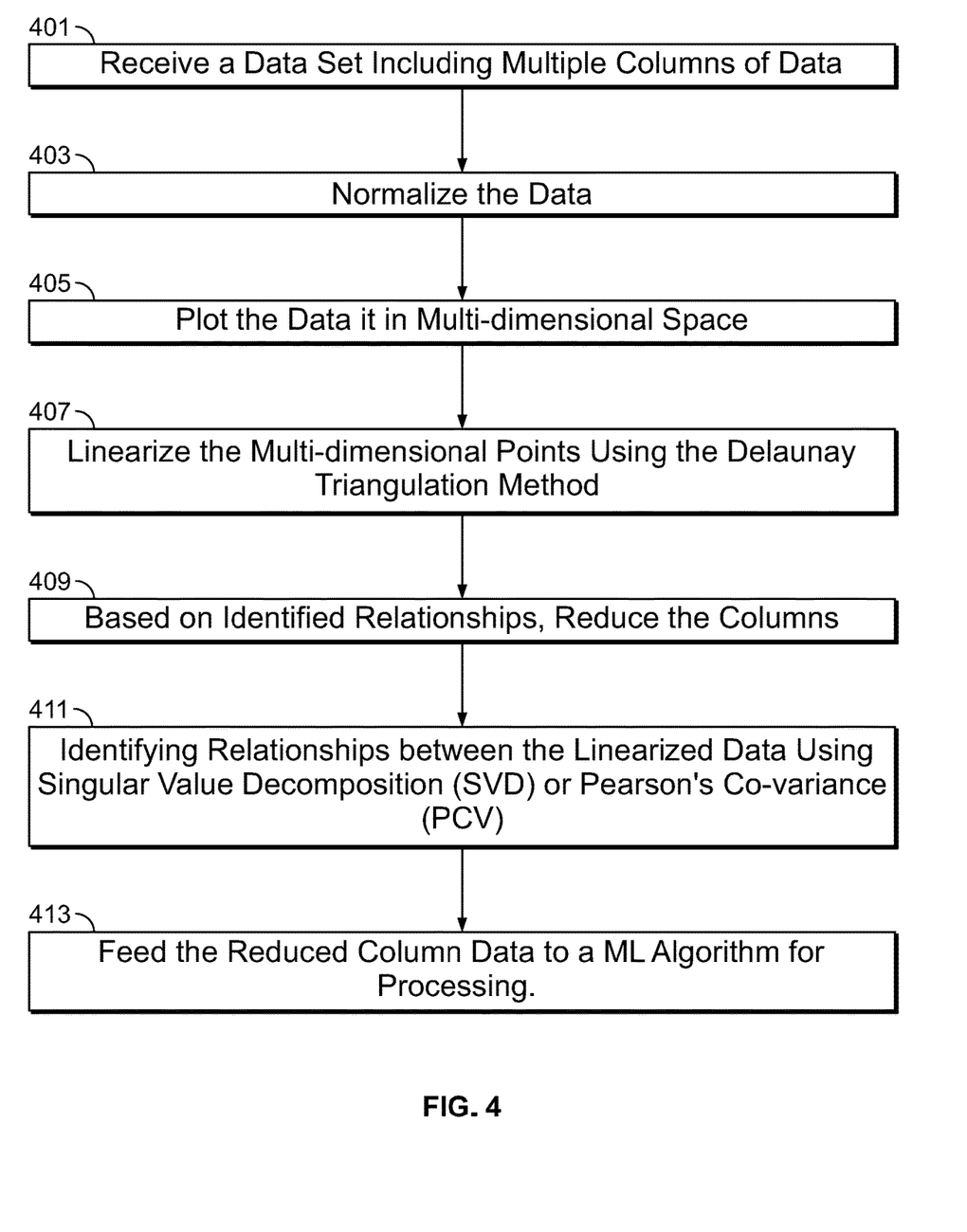
FIG. 4 shows an exemplary method in accordance with the invention.

FIG. 4 shows an exemplary method in accordance with the invention. The method may include some or all of method steps 401-413. In some embodiments, method steps described herein, but not included in FIG. 4, may be included in methods in accordance with the invention.

At step 401, the methods may include receiving a data set including multiple columns of data. At step 403, the methods may include normalizing the data. At step 405, the methods may include plotting the data in multi-dimensional space. At step 407, the methods may include linearizing the multi-dimensional points using the Delaunay triangulation method. At step 409, the methods may include identifying relationships between the linearized data using Singular Value Decomposition (SVD) or Pearson's co-variance (PCV). At step 411, the methods may include, based on identified relationships, reducing the number of columns in the data. At step 413, the methods may include feeding the reduced column data to a ML algorithm for processing. The ML algorithm may be an AI/ML engine. The aforementioned method steps may be performed as described herein.

The methods may also include the AI/ML engine processing the reduced column data and proceeding an output. As a result of receiving the reduced number of features, the AI/ML engine may be optimized. The output may be presented to a user.

Figure 5:
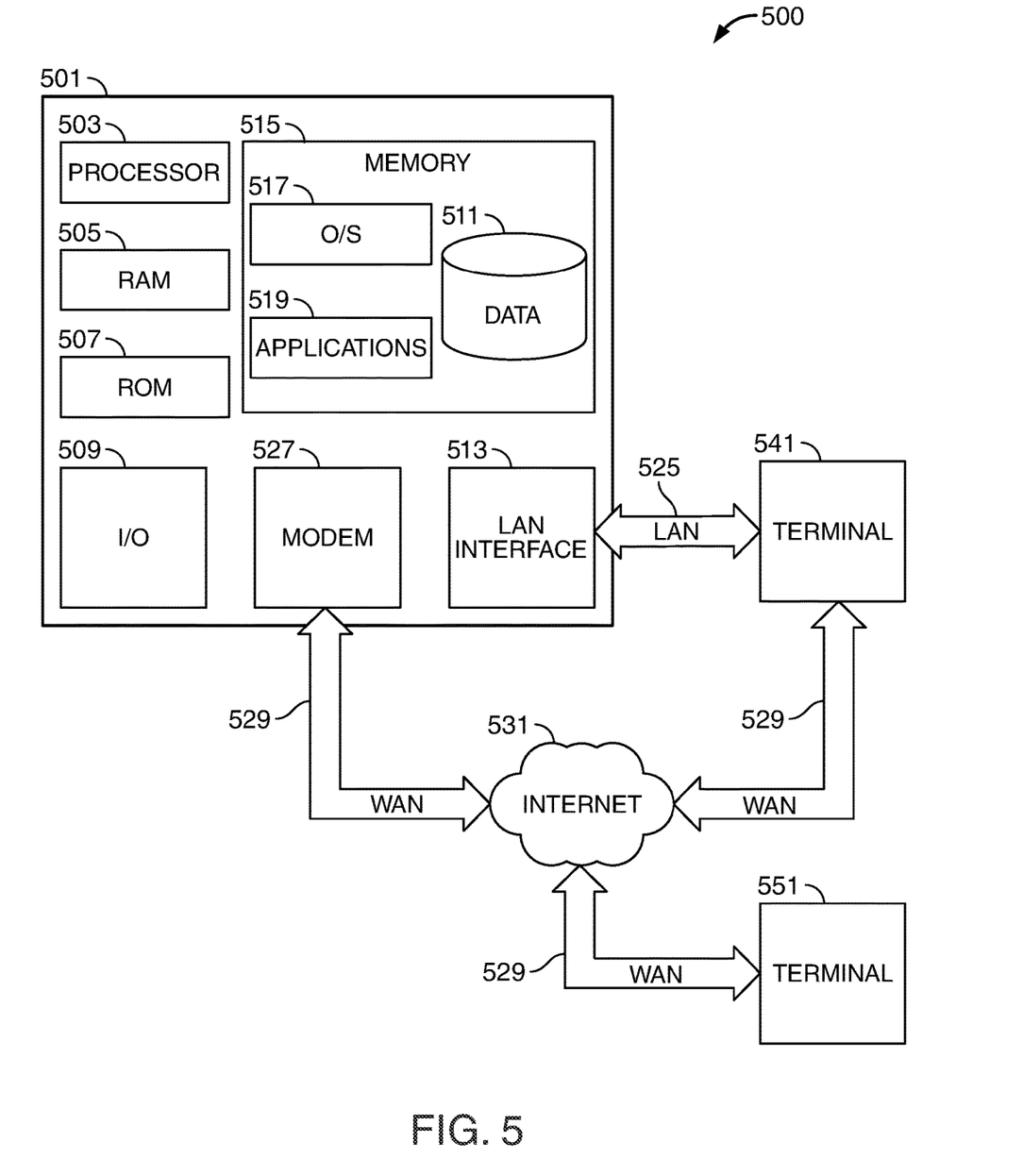
FIG. 5 shows an illustrative block diagram of apparatus in accordance with the invention.

FIG. 5 shows an illustrative block diagram of system 500 that includes computer 501. Computer 501 may alternatively be referred to herein as an "engine," "server" or a "computing device." Computer 501 may be a workstation, desktop, laptop, tablet, smart phone, or any other suitable computing device. Elements of system 500, including computer 501, may be used to implement various aspects of the systems and methods disclosed herein. Apparatus used to execute the algorithms, machine learning models, SVD and PCV described herein may include some or all of the elements and apparatus of system 500.

Computer 501 may have a processor 503 for controlling the operation of the device and its associated components, and may include RAM 505, ROM 507, input/output circuit 509, and a non-transitory or non-volatile memory 515. Machine-readable memory may be configured to store information in machine-readable data structures. The processor 503 may also execute all software running on the computer—e.g., the operating system and/or voice recognition software. Other components commonly used for computers, such as EEPROM or Flash memory or any other suitable components, may also be part of the computer 501.

The memory 515 may be comprised of any suitable permanent storage technology—e.g., a hard drive. The memory 515 may store software including the operating system 517 and application(s) 519 along with any data 511 needed for the operation of computer 501. Memory 515 may also store videos, text, and/or audio assistance files. The data stored in Memory 515 may also be stored in cache memory, or any other suitable memory.

Input/output ("I/O") module 509 may include connectivity to a microphone, keyboard, touch screen, mouse, and/or stylus through which input may be provided into computer 501. The input may include input relating to cursor movement. The input/output module may also include one or more speakers for providing audio output and a video display device for providing textual, audio, audiovisual, and/or graphical output. The input and output may be related to computer application functionality.

Computer 501 may be connected to other systems via a local area network (LAN) interface 513. Computer 501 may operate in a networked environment supporting connections to one or more remote computers, such as terminals 541 and 551. Terminals 541 and 551 may be personal computers or servers that include many or all of the elements described above relative to computer 501. The network connections depicted in FIG. 5 include a local area network (LAN) 525 and a wide area network (WAN) 529, but may also include other networks. When used in a LAN networking environment, computer 501 is connected to LAN 525 through a LAN interface 513 or an adapter. When used in a WAN networking environment, computer 501 may include a modem 527 or other means for establishing communications over WAN 529, such as Internet 531. Connections between Computer 501 and Terminals 551 and/or 541 may be used for connections between firewall filter 117 and one or more of process 119, system configuration 123 and process 121.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 519, which may be used by computer 501, may include computer executable instructions for invoking functionality related to communication, such as e-mail, Short Message Service (SMS), and voice input and speech recognition applications. Application program(s) 519 (which may be alternatively referred to herein as "plugins," "applications," or "apps") may include computer executable instructions for invoking functionality related to performing various tasks. Application programs 519 may utilize one or more algorithms that process received executable instructions, perform power management routines or other suitable tasks. Application programs 519 may perform the multi-dimensional data plotting, data triangulation, relationship identification and data reduction processes described herein. Application programs 519 may additionally, or alternately, execute one or more machine learning algorithms.

Application program(s) 519 may include computer executable instructions (alternatively referred to as "programs"). The computer executable instructions may be embodied in hardware or firmware (not shown). The computer 501 may execute the instructions embodied by the application program(s) 519 to perform various functions.

Application program(s) 519 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 511, and any other suitable information, may be stored in memory 515. One or more of applications 519 may include one or more algorithms that may be used to implement features of the disclosure comprising the processing and reduction of data sets described herein.

The invention may be described in the context of computer-executable instructions, such as applications 519, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 501 and/or terminals 541 and 551 may also include various other components, such as a battery, speaker, and/or antennas (not shown). Components of computer 501 may be linked by a system bus, wirelessly or by other suitable interconnections. Components of computer 501 may be present on one or more circuit boards. In some embodiments, the components may be integrated into a single chip. The chip may be silicon-based.

Terminal 551 and/or terminal 541 may be portable devices such as a laptop, cell phone, Blackberry™, tablet, smartphone, or any other computing system for receiving, storing, transmitting and/or displaying relevant information. Terminal 551 and/or terminal 541 may be one or more user devices. Terminals 551 and 541 may be identical to computer 501 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 6:
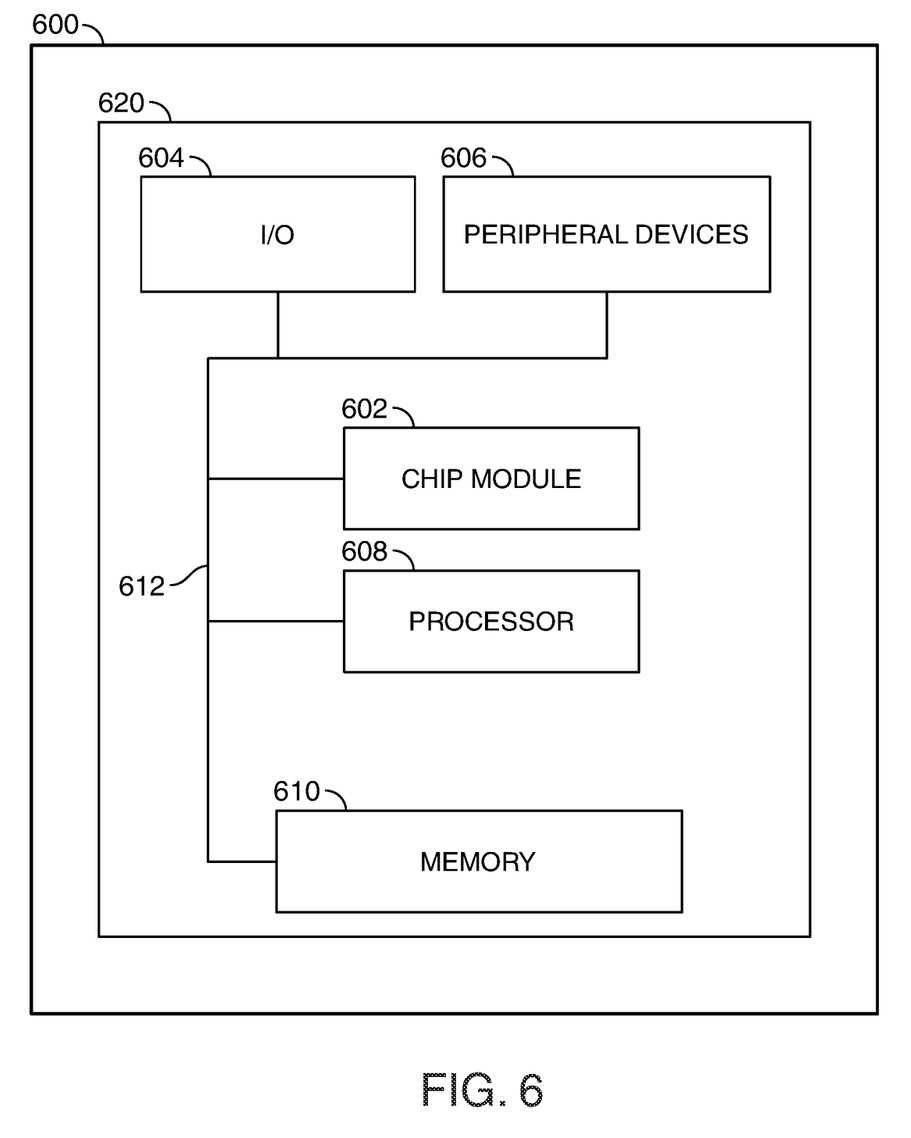
FIG. 6 shows illustrative apparatus that may be configured in accordance with the invention.

FIG. 6 shows illustrative apparatus 600 that may be configured in accordance with the principles of the disclosure. Apparatus 600 may be a computing device. Apparatus 600 may include one or more features of the apparatus shown in FIG. 5. Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable media or devices; peripheral devices 606, which may include counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions, (which may be alternatively referred to herein as "computer instructions" or "computer code"), applications such as applications 519, signals, and/or any other suitable information or data structures.

Components 602, 604, 606, 608 and 610 may be coupled together by a system bus or other interconnections 612 and may be present on one or more circuit boards such as circuit board 620. In some embodiments, the components may be integrated into a single chip. The chip may be silicon-based.

Thus, systems and methods for reducing computational burden on machine learning processes are provided. Persons skilled in the art will appreciate that the present invention can be practiced by other than the described embodiments, which are presented for purposes of illustration rather than of limitation.

What is claimed is:

1. A method for reducing computational load on a machine learning algorithm for processing of a data set, the method for detecting non-linear data dependencies in the data set and subsequently removing data from the data set, the removal of data from the data set reducing machine learning resources and processing time, the method comprising:
receiving a selection of an accuracy metric;
receiving the data set, the data set comprising a plurality of data features, each data feature including a plurality of data elements, the data set for processing by a machine learning model operating on a machine learning system;
normalizing the data elements within each data feature such that the data elements included within each data feature, after the normalization, range between a minimum value and a maximum value;
plotting the data set in multi-dimensional space, wherein each data feature represents an axis in the multi-dimensional space;
linearizing the plotted, multi-dimensional space by feeding the data points of the plotted, multi-dimensional space to an algorithm;
receiving from the algorithm the multi-dimensional space linearized;
detecting linear correlations in the linearized multi-dimensional space using Singular Value Decomposition (SVD);
for a detected linear correlation, identifying a first data feature that has a correlation coefficient with a second data feature that is greater than the accuracy metric;
removing the first data feature from the data set to create a reduced data set;
inputting the reduced data set into the machine learning model; and
outputting a result from the machine learning model;
wherein:
the method further comprises iteratively re-running the SVD until no more correlation coefficients greater than the accuracy metric are identified.

2. The method of claim 1 wherein the data set is a table of data and the data features are columns of data in the table.

3. The method of claim 2 wherein the data elements are data listed in a column.

4. The method of claim 3 wherein each point in the multi-dimensional space represents a row of data included in the data set.

5. The method of claim 1, wherein minimum value is 0 and the maximum value is 1.

6. The method of claim 1, wherein the minimum value is 0 and the maximum value is 100.

7. The method of claim 1 wherein the algorithm is programmed to execute the Delaunay triangulation method.

8. The method of claim 1 wherein the selected accuracy metric is a correlation coefficient is greater than 0.7.

9. The method of claim 7, wherein the Delaunay triangulation method is executed by a classical optimizer operating on a classical hardware processor operating with a hardware memory.

10. A method for reducing computational load on a machine learning algorithm for processing of a data set, the method for detecting non-linear data dependencies in the data set and subsequently removing data from the data set, the removal of data from the data set reducing machine learning resources and processing time, the method comprising:
receiving a selection of an accuracy metric;
receiving a data set, the data set comprising a plurality columns, each column including a plurality of data, the data set for processing by a machine learning model operating on a machine learning system;
normalizing the data within each column such that the data included within each column, after the normalization, ranges between a minimum value and a maximum value;
plotting the data set in multi-dimensional space, wherein each column represents an axis in the multi-dimensional space and each row represents a point in the multi-dimensional space;
linearizing the plotted, multi-dimensional space by feeding the data points of the plotted, multi-dimensional space to an algorithm;
receiving from the algorithm the multi-dimensional space linearized;
detecting linear correlations in the linearized multi-dimensional space using Singular Value Decomposition (SVD);
for a detected linear correlation, identifying a first data feature that has a correlation coefficient with a second data feature that is greater than the accuracy metric;
removing the first data feature from the data set to create a reduced data set;
inputting the reduced data set into the machine learning model; and
outputting a result from the machine learning model;
wherein:
the method further comprises iteratively re-running the SVD until no more correlation coefficients greater than the accuracy metric are identified.

11. The method of claim 10, wherein the minimum value is 0 and the maximum value is 1.

12. The method of claim 10, wherein the minimum value is 0 and the maximum value is 100.

13. The method of claim 10, wherein the algorithm is programmed to execute the Delaunay triangulation method, the Delaunay triangulation method being executed by a classical optimizer operating on a classical hardware processor operating with a hardware memory.

14. The method of claim 10 wherein the selected accuracy metric is a correlation coefficient is greater than 0.7.

15. The method of claim 10 wherein the selected accuracy metric is a correlation coefficient greater than 0.5.

16. A method for reducing computational load on a machine learning algorithm for processing of a data set, the method for detecting non-linear data dependencies in the data set and subsequently removing data from the data set, the removal of data from the data set reducing machine learning resources and processing time, the method comprising:
receiving a selection of an accuracy metric;
receiving a data set, the data set comprising a plurality of data features, each data feature including a plurality of data elements, the data set for processing by a machine learning model operating on a machine learning system;
normalizing the data elements within each data feature such that the data elements included within each data feature, after the normalization, range between a minimum value and a maximum value;
plotting the data set in multi-dimensional space, wherein each data feature represents an axis in the multi-dimensional space;
linearizing the plotted, multi-dimensional space by feeding the data points of the plotted, multi-dimensional space to an algorithm programmed to execute the Delaunay triangulation method;
receiving from the algorithm the multi-dimensional space linearized;
detecting linear correlations in the linearized multi-dimensional space using Pearson's co-variance (PCV);
for a detected linear correlation, identifying a first data feature that has a correlation coefficient with a second data feature that is greater than the accuracy metric;
removing the first data feature from the data set to create a reduced data set;
inputting the reduced data set into the machine learning model; and
outputting a result from the machine learning model;
wherein:
the method further comprises iteratively re-running the SVD until no more correlation coefficients greater than the accuracy metric are identified.

17. The method of claim 16 wherein the selected accuracy metric is a correlation coefficient is greater than 0.7.

18. The method of claim 16 wherein the selected accuracy metric is a correlation coefficient greater than 0.5.

* * * * *